US011221226B2

(12) United States Patent
Takahashi et al.

(10) Patent No.: US 11,221,226 B2
(45) Date of Patent: Jan. 11, 2022

(54) PASSING GATE DETERMINING DEVICE, VEHICLE CONTROL SYSTEM, PASSING GATE DETERMINING METHOD, AND STORAGE MEDIUM

(71) Applicant: HONDA MOTOR CO., LTD., Tokyo (JP)

(72) Inventors: Kazuyuki Takahashi, Wako (JP); Akihiko Otsu, Wako (JP); Akira Mizutani, Wako (JP); Atsushi Ishioka, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

(21) Appl. No.: 16/481,589

(22) PCT Filed: Feb. 3, 2017

(86) PCT No.: PCT/JP2017/003920
§ 371 (c)(1),
(2) Date: Jul. 29, 2019

(87) PCT Pub. No.: WO2018/142566
PCT Pub. Date: Aug. 9, 2018

(65) Prior Publication Data
US 2019/0353493 A1 Nov. 21, 2019

(51) Int. Cl.
*G01C 21/34* (2006.01)
*G05D 1/00* (2006.01)
(Continued)

(52) U.S. Cl.
CPC ..... *G01C 21/3461* (2013.01); *G01C 21/3492* (2013.01); *G05D 1/0088* (2013.01);
(Continued)

(58) Field of Classification Search
CPC ............ G01C 21/3461; G01C 21/3407; G05D 1/0088; G06K 9/00791
See application file for complete search history.

(56) References Cited

U.S. PATENT DOCUMENTS 7,956,768 B2 *  6/2011  Roberts .............. G06Q 30/0284
                                                      340/928
8,060,303 B2 * 11/2011  Bando .............. G08G 1/096861
                                                      701/414
(Continued)

FOREIGN PATENT DOCUMENTS

DE    102012022629 A1 *  6/2013
JP       2001-41755    *  2/2001
(Continued)

OTHER PUBLICATIONS

International Search Report and Written Opinion for International Application Serial No. PCT/JP2017/003920 dated May 9, 2017, 13 pages.

*Primary Examiner* — Michael J Zanelli
(74) *Attorney, Agent, or Firm* — Amin, Turocy & Watson, LLP

(57) ABSTRACT

A passing gate determining device including: an information acquirer configured to acquire a status of vehicles in front of gates in a place in which a plurality of gates are aligned; and a gate selector configured to select a gate through which a vehicle is to pass among the plurality of gates on the basis of the status acquired by the information acquirer.

14 Claims, 12 Drawing Sheets

(51) Int. Cl.
    *G06K 9/00*        (2006.01)
    *G08G 1/052*     (2006.01)

(52) U.S. Cl.
    CPC ......... *G06K 9/00825* (2013.01); *G08G 1/052* (2013.01); *G05D 2201/0213* (2013.01)

(56) References Cited

U.S. PATENT DOCUMENTS

| | | | | |
|---|---|---|---|---|
| 2016/0379493 A1* | 12/2016 | Bhuiya | ............... | H04W 4/40 |
| | | | | 701/117 |
| 2017/0232967 A1* | 8/2017 | Tomatsu | ........... | B60W 30/0956 |
| | | | | 701/117 |

FOREIGN PATENT DOCUMENTS

| | | |
|---|---|---|
| JP | 2001-227976 | 8/2001 |
| JP | 2002-049947 | 2/2002 |
| JP | 2009-031205 | 2/2009 |
| JP | 2011-209818 | 10/2011 |
| JP | 2011-214914 | 10/2011 |
| JP | 2012-154951 | 8/2012 |
| JP | 2013-140430 | 7/2013 |
| JP | 2014-119372 | 6/2014 |
| JP | 2015-111386 | 6/2015 |
| JP | 2016-153738 | 8/2016 |

* cited by examiner

PASSING GATE DETERMINING DEVICE, VEHICLE CONTROL SYSTEM, PASSING GATE DETERMINING METHOD, AND STORAGE MEDIUM

TECHNICAL FIELD

The present invention relates to a passing gate determining device, a vehicle control system, a passing gate determining method, and a storage medium.

BACKGROUND ART

Conventionally, an invention of a navigation device that recognizes operating gates at a tollgate by processing a captured image, identifies any one of the recognized operating gates, sets a travelling path from the current position of a vehicle to the identified operating gate, and displays the set travelling path on an HUD is disclosed (see Patent Literature 1).

CITATION LIST

Patent Literature

[Patent Literature 1]
Japanese Unexamined Patent Application, First Publication No. 2014-119372

SUMMARY OF INVENTION

Technical Problem

In the conventional technology described above, while a shortest travelling route is set and guidance is performed by identifying a closest operating gate from the current position of a vehicle, it cannot be determined that the shortest travelling route is an optimal travelling route.

The present invention is in consideration of such situations, and one object thereof is to provide a passing gate determining device, a vehicle control system, a passing gate determining method, and a storage medium capable of selecting an appropriate gate in accordance with prior-gate statuses.

Solution to Problem (1): A passing gate determining device including: an information acquirer configured to acquire a status of vehicles in front of gates in a place in which a plurality of gates are aligned; and a gate selector configured to select a gate through which a vehicle is to pass among the plurality of gates on the basis of the status acquired by the information acquirer.

(2): The passing gate determining device according to (1), the gate selector estimates an arrival time until arrival at each of the plurality of gates and selects a gate having the shortest arrival time.

(3): The passing gate determining device according to (1), the gate selector selects a gate on the basis of an amount of passage for each of the plurality of gates, the gate selector selecting a gate in which amount of passage is higher.

(4): The passing gate determining device according to (3), in the invention described in claim 3, the gate selector estimates the amount of passage on the basis of a speed of a vehicle disposed at the end of the vehicle row formed for each gate.

(5): The passing gate determining device according to (1), the gate selector selects a gate on the basis of the number of vehicles forming a vehicle row for each of the plurality of gates.

(6): The passing gate determining device according to (5), the gate selector selects a gate for which the number of vehicles forming the vehicle row is the smallest with priority.

(7): The passing gate determining device according to (5), the gate selector predicts vehicle rows in which vehicles not forming a vehicle row will be aligned among the vehicles in front of the gates and selects a gate on the basis of a result of the prediction.

(8): The passing gate determining device according to claim 5), the gate selector excludes a gate for which the number of vehicles forming the vehicle row is smaller than a predetermined number from a selection target.

(9): The passing gate determining device according to claim 1), further includes a mounting state detector configured to detect whether or not a medium used for an automatic toll collecting system is mounted in a medium mounting unit, wherein the gate selector selects a gate used only for the automatic toll collecting system with priority in a case in which it is detected by the mounting state detector that the medium is mounted in the medium mounting unit.

(10): A vehicle control system including: the passing gate determining device described in (1); and an automated driving controller configured to execute automated driving such that the vehicle passes through a gate selected by the passing gate determining device.

(11): A passing gate determining method using a computer, the passing gate determining method including: acquiring a status of vehicles in front of gates in a place in which a plurality of gates are aligned; and selecting a gate through which a vehicle is to pass among the plurality of gates on the basis of the acquired status.

(12): A computer-readable non-transitory storage medium storing a program causing a computer to execute: acquiring a status of vehicles in front of gates in a place in which a plurality of gates are aligned; and selecting a gate through which a vehicle is to pass among the plurality of gates on the basis of the acquired status.

Advantageous Effects of Invention

According to inventions described in the claims, an appropriate gate can be selected in accordance with prior-gate statuses.

DESCRIPTION OF EMBODIMENTS

Hereinafter, a passing gate determining device, a vehicle control system, a passing gate determining method, and a program according to embodiments of the present invention will be described with reference to the drawings. A passing gate determining device may be a part of a device determining a path in which a vehicle is to run and guiding the path (a so-called navigation device) in a vehicle performing manual driving and may be a device that assists the process of determining a target trajectory that is a guideline for automated driving in a vehicle performing automated driving.

Figure 1:
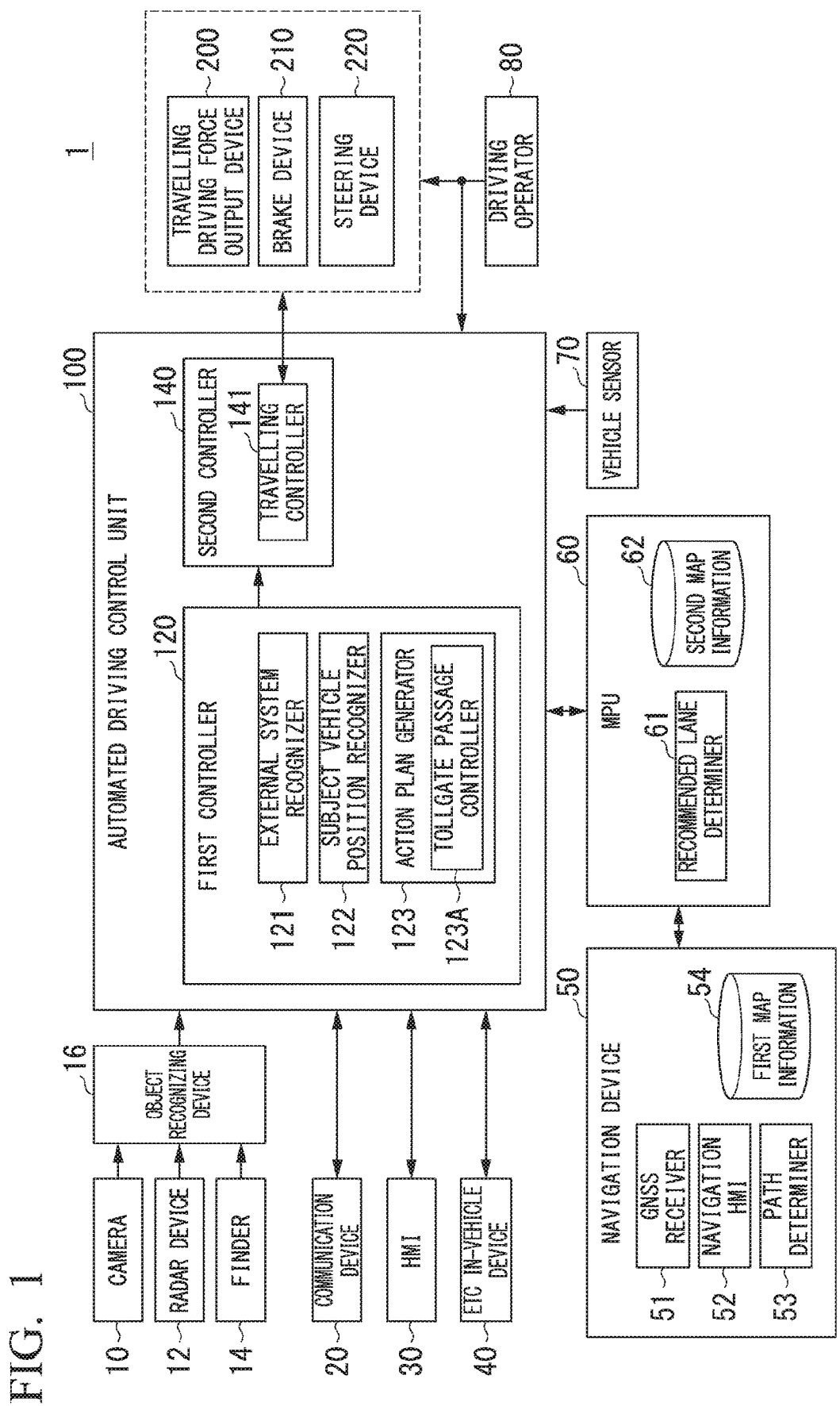
FIG. 1 is a diagram illustrating one example of the configuration of a vehicle system.

FIG. 1 is a diagram illustrating one example of the configuration of a vehicle system 1 according to an embodiment. In the vehicle system 1, for example, a camera 10, a radar device 12, a finder 14, an object recognizing device 16, a communication device 20, a human machine interface (HMI) 30, an ETC in-vehicle device 40, a navigation device 50, a micro-processing unit (MPU) 60, a vehicle sensor 70, a driving operator 80, an automated driving control unit 100, a travelling driving force output device 200, a brake device 210, and a steering device 220 are mounted. Such devices and units are interconnected using a multiplex communication line such as a controller area network (CAN) communication line, a serial communication line, a radio communication network, or the like. In addition, the configuration illustrated in FIG. 1 is merely one example, and thus, some components may be omitted, and, furthermore, another component may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places of the vehicle M. In a case in which the side in front is to be imaged, the camera 10 is installed at an upper part of a front windshield, a rear face of a rear-view mirror, or the like. The camera 10, for example, repeatedly images the vicinity of the vehicle M periodically. The camera 10 may be a stereo camera.

The radar device 12 emits radiowaves such as millimeter waves to the vicinity of the vehicle M and detects at least a position (a distance and an azimuth) of an object by detecting radiowaves (reflected waves) reflected by the object. One or a plurality of radar devices 12 are installed at arbitrary places in the vehicle M. The radar device 12 may detect a position and a speed of an object using a frequency modulated continuous wave (FM-CW) system.

The finder 14 is a light detection and ranging or a laser imaging detection and ranging (LIDAR) finder that detects a distance to a target by measuring light scattered from emitted light. One or a plurality of finders 14 are installed at arbitrary places in the vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving control unit 100. In addition, the object recognizing device 16 may output a part of information input from the camera 10, the radar device 12, or the finder 14 to the automated driving control unit 100 as it is.

The communication device 20, for example, communicates with other vehicles present in the vicinity of the vehicle M or a road-side device using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the vehicle M and accepts an input operation performed by the vehicle occupant. The HMI 30 includes various display devices, a speaker, a buzzer, a touch panel, a switch, a key, a vibrator attached to a sheet or a steering wheel, and the like.

The ETC in-vehicle device 40 is a device for using an automatic toll collecting system. The ETC in-vehicle device 40 includes a mounting unit in which an ETC card is mounted and a radio communication unit that communicates with an ETC road-side device disposed at a gate of a toll road. The radio communication unit may be configured to be common to the communication device 20. The ETC in-vehicle device 40 exchanges information of an entrance tollgate, an exit tollgate, and the like by communicating with the ETC road-side device. The ETC road-side device determines a charging amount for a vehicle occupant of the subject vehicle M on the basis of such information and causes a billing process to proceed.

The navigation device 50, for example, includes a global navigation satellite system (GNSS) receiver 51, a navigation HMI 52, and a path determiner 53 and stores first map information 54 in a storage device such as a hard disk drive (HDD) or a flash memory. The GNSS receiver identifies a position of the vehicle M on the basis of signals received from GNSS satellites. The position of the vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The path determiner 53, for example, determines a path from a location of the vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The path determined by the path determiner 53 is output to the MPU 60. In addition, the navigation device 50 may perform path guidance using the navigation HMI 52 on the basis of the path determined by the path determiner 53. Furthermore, the navigation device 50, for example, may be realized by a function of a terminal device such as a smartphone or a tablet terminal carried by a user. In addition, the navigation device 50 may transmit a current location and a destination to a navigation server through the communication device 20 and acquire a path received from the navigation server as a reply.

The MPU 60, for example, functions as a recommended lane determiner 61 and maintains second map information 62 in a storage device such as an HDD or a flash memory. The recommended lane determiner 61 divides a path provided from the navigation device 50 into a plurality of blocks (for example, divides the path into blocks of 100m in the advancement direction of the vehicle) and determines a recommended lane for each block by referring to the second map information 62. The recommended lane determiner 61 determines which lane to run from the left side. In a case in which a branching place, a merging place, or the like is present in the path, the recommended lane determiner 61 determines a recommended lane such that the vehicle M can run on a reasonable travelling path for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. In the road information, information representing a type of road such as an expressway, a toll road, a national highway, or a prefectural road, the number of lanes of a road, a width of each lane, a gradient of a road, a position of a road (three-dimensional coordinates including longitude, latitude, and a height), a curvature of the curve of a lane, locations of merging and branching points of lanes, a sign installed on a road, a gate structure for each tollgate (information of the number of gates, gates that are dedicated for ETC, and the like), and the like are included. The second map information 62 may be updated as is necessary by accessing another device using the communication device 20.

The vehicle sensor 70 includes a vehicle speed sensor detecting a speed of the vehicle M, an acceleration sensor detecting an acceleration, a yaw rate sensor detecting an angular velocity around a vertical axis, an azimuth sensor detecting the direction of the vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection acquired by the sensor described above is output to the automated driving control unit 100 or the travelling driving force output device 200 and one or both of the brake device 210 and the steering device 220.

The automated driving control unit 100, for example, includes a first controller 120, a second controller 140, and a vehicle occupant state detecting unit 160. Each of the first controller 120, the second controller 140, and the vehicle occupant state detecting unit 160 is realized by a processor such as a central processing unit (CPU) executing a program (software). In addition, some or all of the functional units of the first controller 120, the second controller 140, and the vehicle occupant state detecting unit 160 to be described below may be realized by hardware such as a large scale integration (LSI), an application specific integrated circuit (ASIC), a field-programmable gate array (FPGA), or the like or may be realized by software and hardware in cooperation.

The first controller 120, for example, includes the external system recognizer 121, the subject vehicle position recognizer 122, and the action plan generator 123.

The external system recognizer 121 recognizes states of surrounding vehicles such as positions, speeds, and accelerations on the basis of information input from the camera 10, the radar device 12, and the finder 14 directly or through the object recognizing device 16. The position of a surrounding vehicle may be represented as a representative point of the surrounding vehicle such as the center of gravity, a corner, or the like and may be represented by an area represented by the contour of the surrounding vehicle. The "state" of a surrounding vehicle may include an acceleration or a jerk or may be an "action state" (for example, the vehicle is changing lanes or is to change lanes) of the surrounding vehicle. In addition, the external system recognizer 121 may recognize positions of guard rails, electric poles, parked vehicles, pedestrians, and other objects in addition to surrounding vehicles.

The subject vehicle position recognizer 122, for example, recognizes a lane (travelling lane) in which the vehicle M runs and a relative position and a posture of the vehicle M with respect to the travelling lane. The subject vehicle position recognizer 122, for example, by comparing a pattern (for example, an array of solid lines and broken lines) of a road partition line that is acquired from the second map information 62 with a pattern of the road partition line in the vicinity of the vehicle M that is recognized from an image captured by the camera 10, recognizes a travelling lane. In the recognition, the position of the vehicle M acquired from the navigation device 50 and a processing result acquired using the INS may be additionally taken into account.

Figure 2:
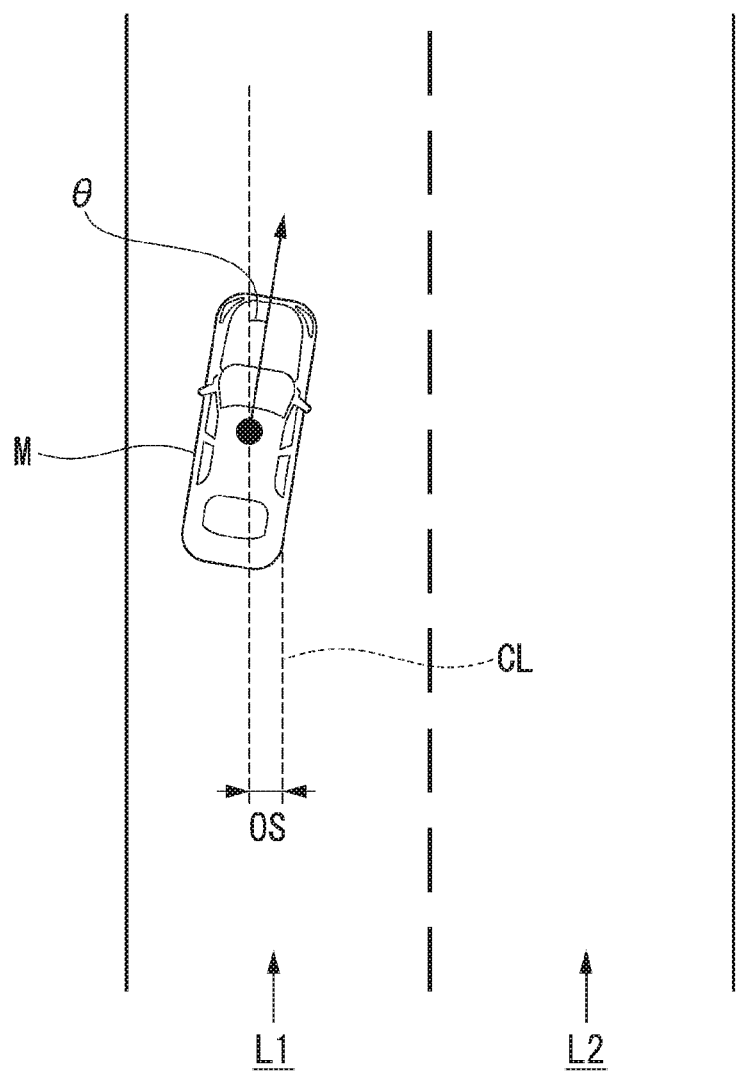
FIG. 2 is a diagram illustrating a view in which a relative position and a relative posture of a vehicle M with respect to a travelling lane L1 are recognized by a subject vehicle position recognizer.

Then, the subject vehicle position recognizer 122, for example, recognizes a position and a posture of the vehicle M with respect to the travelling lane. FIG. 2 is a diagram illustrating a view in which a relative position and a posture of a vehicle M with respect to a travelling lane L1 are recognized by the subject vehicle position recognizer 122. The subject vehicle position recognizer 122, for example, recognizes an offset OS of a reference point (for example, center of gravity) of the vehicle M from travelling lane center CL and an angle □ of an advancement direction of the vehicle M formed with respect to a line acquired by aligning the travelling lane center CL as a relative position and a posture of the vehicle M with respect to the travelling lane L1. In addition, instead of this, the subject vehicle position recognizer 122 may recognize a position of the reference point of the vehicle M with respect to one side end of the lane L1 or the like as a relative position of the vehicle M with respect to the travelling lane. The relative position of the vehicle M recognized by the subject vehicle position recognizer 122 is provided for the recommended lane determiner 61 and the action plan generator 123.

The action plan generator 123 determines events to be sequentially executed in automated driving such that the vehicle M runs in a recommended lane determined by the recommended lane determiner 61 and deals with a surrounding status of the vehicle M. As the events, for example, there are a constant-speed travelling event in which the subject vehicle runs at a constant speed in the same travelling lane, a following travelling event in which the subject vehicle follows a preceding vehicle, a lane changing event, a merging event, a branching event, an emergency stop event, a tollgate event for passing through a tollgate, a handover event for ending automated driving and switching to manual driving, and the like. In addition, during the execution of such an event, there are cases in which an action for avoidance is planned on the basis of surrounding statuses of the vehicle M (the presence/absence of surrounding vehicles and pedestrians, lane contraction according to road construction, and the like).

The action plan generator 123 generates a target trajectory in which the vehicle M will run in the future. The target trajectory, for example, includes a speed element. For example, the target trajectory is generated as a set of target points (trajectory points) to be reached at reference times by setting a plurality of the reference times in the future for every predetermined sampling time (for example, a fraction of a [sec]). For this reason, in a case in which an interval between trajectory points is large, it represents that the vehicle runs in a section between the trajectory points at a high speed.

Figure 3:
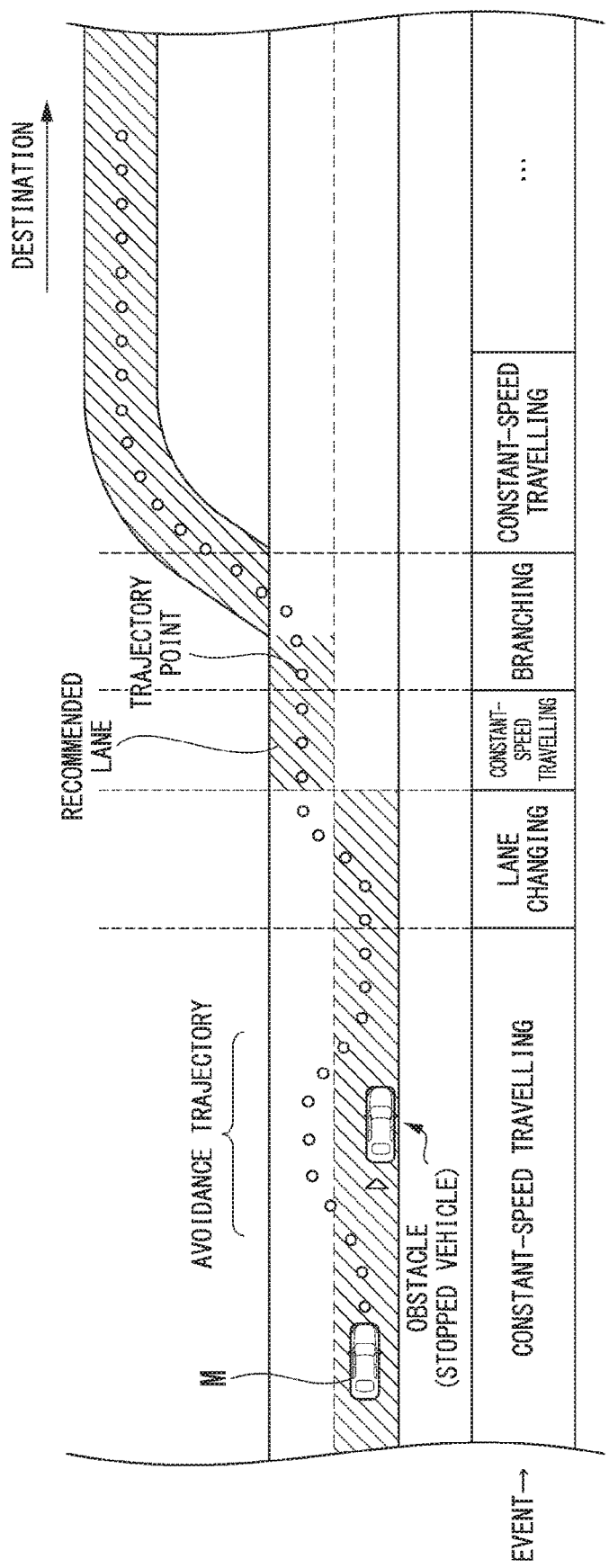
FIG. 3 is a diagram illustrating a view in which a target trajectory is generated on the basis of a recommended lane.

FIG. 3 is a diagram illustrating a view in which a target trajectory is generated on the basis of a recommended lane. As illustrated in the drawing, the recommended lane is set such that it is convenient for the subject vehicle to run along a path to a destination. When the subject vehicle reaches a point before a predetermined distance from a recommended lane switching place (may be determined in accordance with a type of event), the action plan generator 123 starts the lane changing event, the branching event, the merging event, or the like. In a case in which there is a need for avoiding an obstacle during the execution of each event, as illustrated in the drawing, an avoidance trajectory is generated.

The action plan generator 123, for example, generates a plurality of candidates of a target trajectory and selects a target trajectory that is optimal at that time point on the basis of the viewpoints of safety and efficiency.

The action plan generator 123 includes an information acquirer 123A as a sub functional unit for executing a tollgate event. This will be described later.

The second controller 140 includes a travelling controller 141. The travelling controller 141 controls the travelling driving force output device 200, the brake device 210, and the steering device 220 such that the subject vehicle M passes along a target trajectory generated by the action plan generator 123 at a scheduled time.

The travelling driving force output device 200 outputs a travelling driving force (torque) for allowing a vehicle to run to driving wheels. The travelling driving force output device 200, for example, includes a combination of an internal combustion engine, an electric motor, a transmission gear, and the like and an ECU controlling such components. The ECU controls the components described above on the basis of information input from the automated driving control unit 100 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the automated driving control unit 100 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the travelling controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the automated driving control unit 100 or information input from the driving operator 80.

[Tollgate Passage Control]

Figure 4:
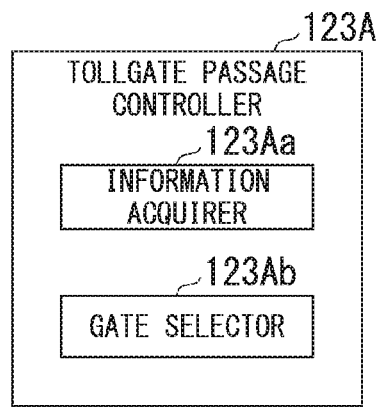
FIG. 4 is a functional configuration diagram of a tollgate passage controller.

Hereinafter, the function of the tollgate passage controller 123A will be described. FIG. 4 is a functional configuration diagram of the tollgate passage controller 123A. The tollgate passage controller 123A, for example, includes an information acquirer 123Aa and a gate selector 123Ab. The information acquirer 123Aa acquires prior-gate statuses. The gate selector 123Ab selects a gate through which the subject vehicle M will pass among a plurality of gates on the basis of the statuses acquired by the information acquirer 123Aa.

Figure 5:
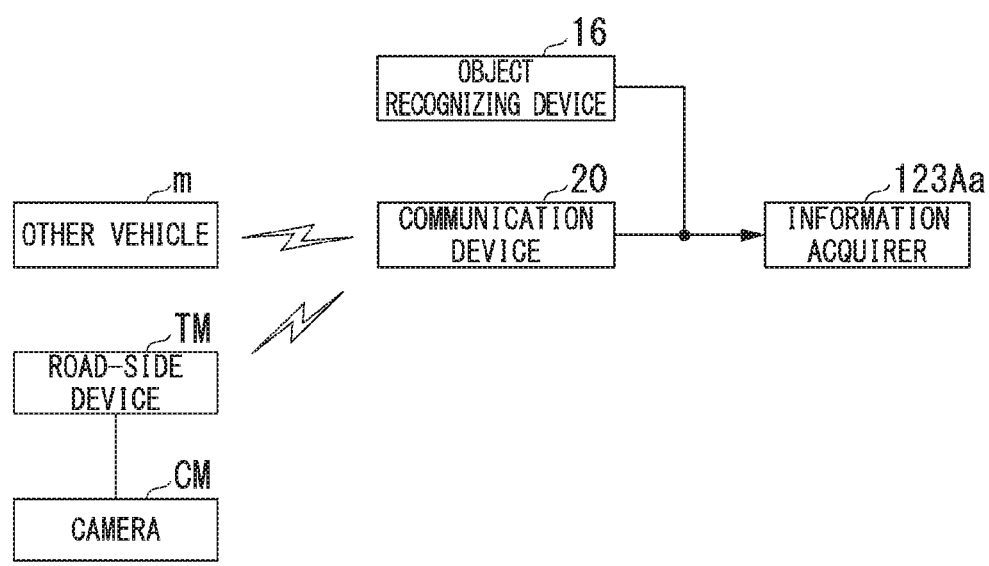
FIG. 5 is a diagram illustrating a structure in which prior-gate statuses are acquired by an information acquirer.

FIG. 5 is a diagram illustrating a structure in which prior-gate statuses are acquired by an information acquirer 123Aa. As illustrated in the drawing, the information acquirer 123Aa acquires a position, a type, a speed, and the like of an object from the object recognizing device 16 and acquires various kinds of information from another vehicle m and a road-side device TM through the communication device 20. Another vehicle m transmits the position and the speed thereof, information acquired by analyzing a captured image acquired by an in-vehicle camera, and the like to the communication device 20 of the subject vehicle M. The road-side device TM, for example, is connected to a camera CM that images a vehicle in a bird's eye view from a gate, calculates the position, the speed, and the like of a vehicle in front of the gate, and transmits the position, the speed, and the like to the communication device 20 of the subject vehicle M. In addition, the road-side device TM counts the number of vehicles passing through each gate per unit time (the amount of passage through the gate) and may transmit a result thereof to the communication device 20 of the subject vehicle M or transmit information of gates that are operating to the communication device 20 of the subject vehicle M. When various kinds of information are acquired in such a form, the information acquirer 123Aa integrates the information and acquires or derives positions and speed vectors of other vehicles in front of gates of a tollgate (hereinafter referred to as a prior-gate status). Hereinafter, description will be presented on the premise of this.

Figure 6:
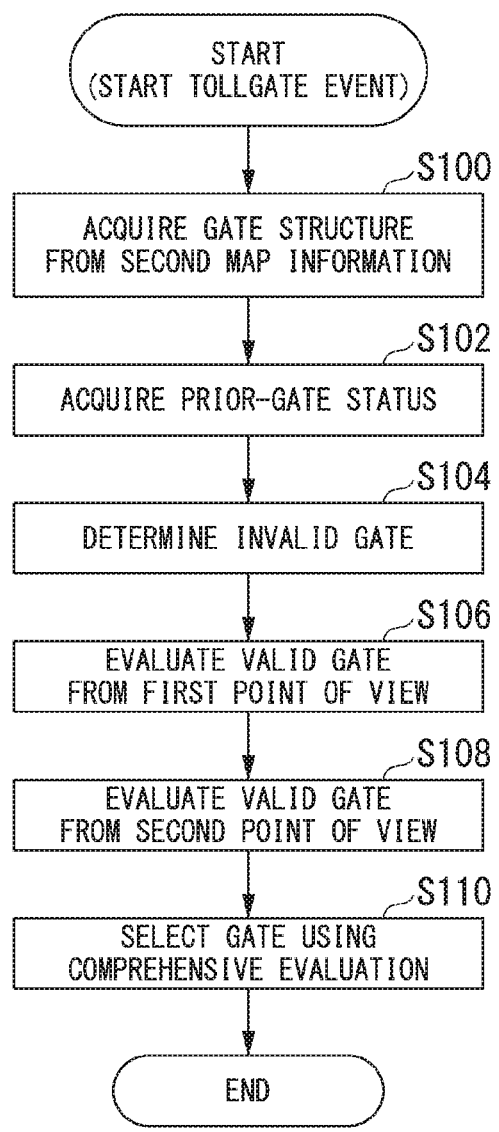
FIG. 6 is a flowchart illustrating one example of the flow of the entire process executed by a gate selector.

FIG. 6 is a flowchart illustrating one example of the flow of the entire process executed by the gate selector 123Ab. The process of this flowchart, for example, is executed together with the start of a tollgate event. First, the gate selector 123Ab acquires a gate structure of a tollgate in front of a subject vehicle M from the second map information 62 (Step S100), acquires a prior-gate status (Step S102), and determines a gate that is not operating (invalid gate) (Step S104). The gate selector 123Ab, for example, determines an invalid gate on the basis of the information acquired from another vehicle m or the road-side device TM through the communication device 20 or by analyzing a captured image acquired using the camera 10 of the subject vehicle M. At this time, the gate selector 123Ab may recognize display details of signage or the like representing a valid gate or an invalid gate by analyzing a captured image acquired by the camera 10 installed at a gate or determine an invalid gate by analyzing a captured image acquired by the camera 10 or on the basis of the number of other vehicles m forming a vehicle row for each gate perceived on the basis of the information acquired from another vehicle m or the road-side device TM through the communication device 20. For example, the gate selector 123Ab may estimate a gate with which no other vehicle m is aligned (or with which only a small number of other vehicles m are aligned) as an invalid gate and set the gate as a non-target for evaluation and selection. More specifically, the gate selector 123Ab may set a gate with which the number of other vehicles m that are aligned (form a vehicle row) is smaller than a predetermined number of vehicles k as a non-target for an evaluation and selection. For example, k=1. The vehicle row will be described later.

Next, the gate selector 123Ab evaluates gates that are operating (valid gates) from a first point of view (Step S106), thereafter evaluates valid gates from a second point of view (Step S108), and selects a gate using a comprehensive evaluation thereof (Step S110).

[Evaluation of First Point of View]

Hereinafter, an evaluation of a first point of view will be described. The evaluation of the first point of view involves evaluating a gate more highly when it is estimated that the gate can be reached (passed) more quickly. The evaluation of the first point of view is performed by any one of evaluation techniques illustrated below as examples or a combination thereof.

(Evaluation Technique 1)

Figure 7:
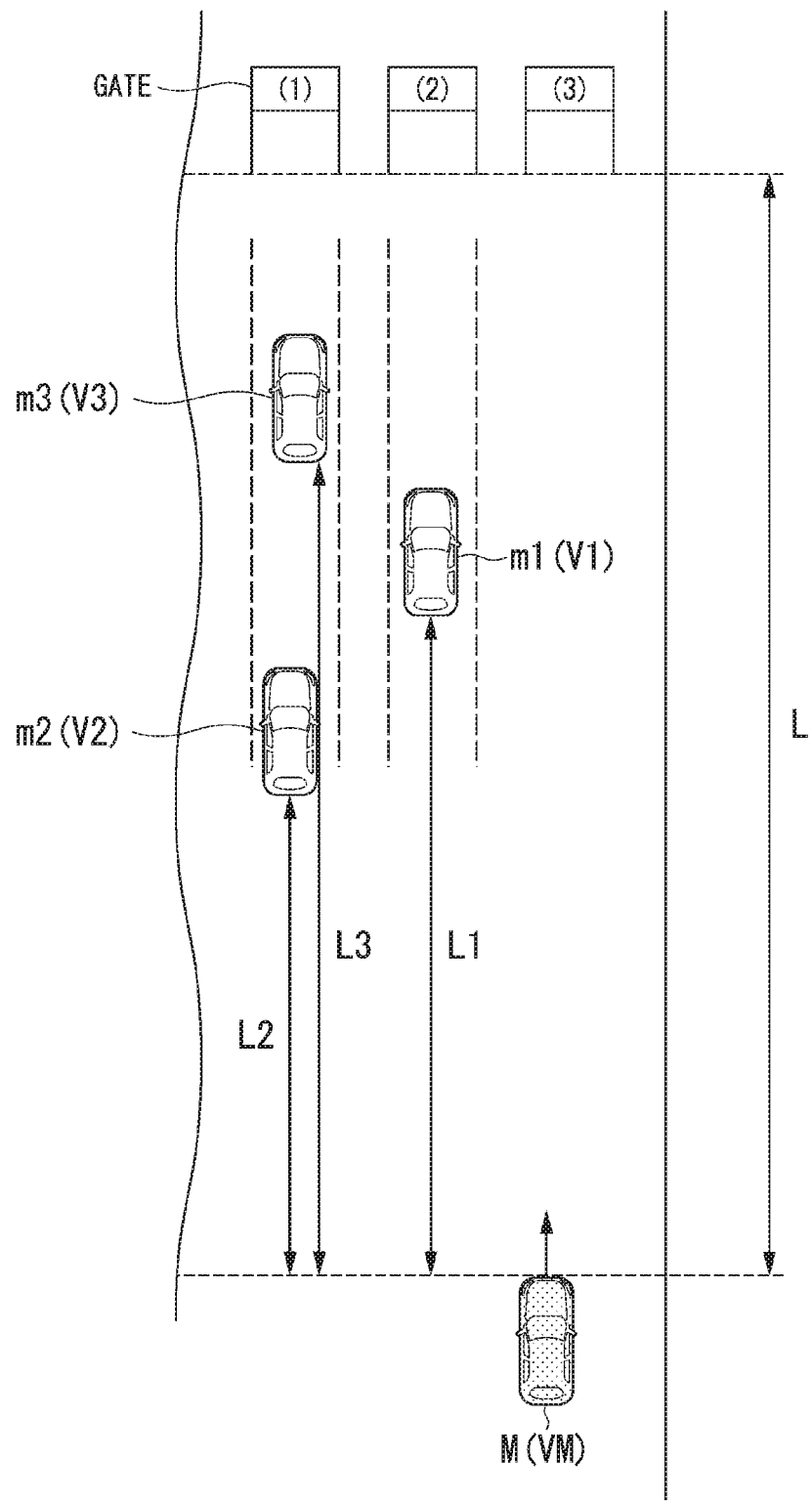
FIG. 7 is a diagram illustrating an evaluation technique 1.

The gate selector 123Ab, for example, estimates an arrival time at each valid gate and evaluates a gate more highly as the arrival time is shorter. FIG. 7 is a diagram illustrating an evaluation technique 1. The gate selector 123Ab, for example, estimates an arrival time T using a technique described below for each of gates (1) to (3) that are illustrated in FIG. 7. In FIG. 7, L represents a distance from a subject vehicle M to a gate in an advancement direction, L1 represents a distance from the subject vehicle M to another vehicle m1, L2 represents a distance from the subject vehicle M to another vehicle m2, and L3 represents a distance from the subject vehicle M to another vehicle m3. It is assumed that the subject vehicle M is travelling at a speed VM, and the other vehicles m1, m2, and m3 are travelling at speeds V1, V2, and V3.

Figure 8:
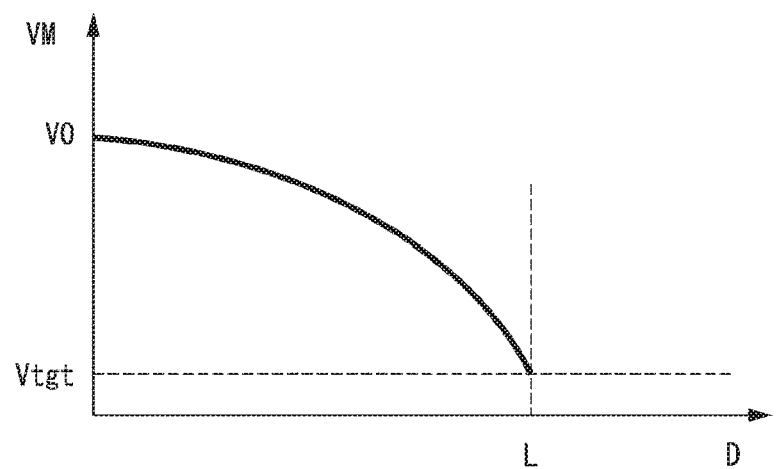
FIG. 8 is a diagram illustrating one example of a speed profile used for estimating an arrival time T.

There is no vehicle in front of the gate (3). In this case, the gate selector 123Ab estimates an arrival time T on the basis of a speed profile illustrated in FIG. 8. In the drawing, V0 is a speed VM at an initial time point, and Vtgt is a target speed (for example, about 20 [km/h]) at the time of arriving at a gate. The gate selector 123Ab generates a speed profile for travelling a distance L using a deceleration model not causing a vehicle occupant to feel discomfort (for example, a constant deceleration model, a constant jerk model, or the like). In this case, the arrival time T is calculated on the basis of Equation (1).

[Math 1]

$$\int_0^T VM \cdot dt = L \tag{1}$$

Figure 9:
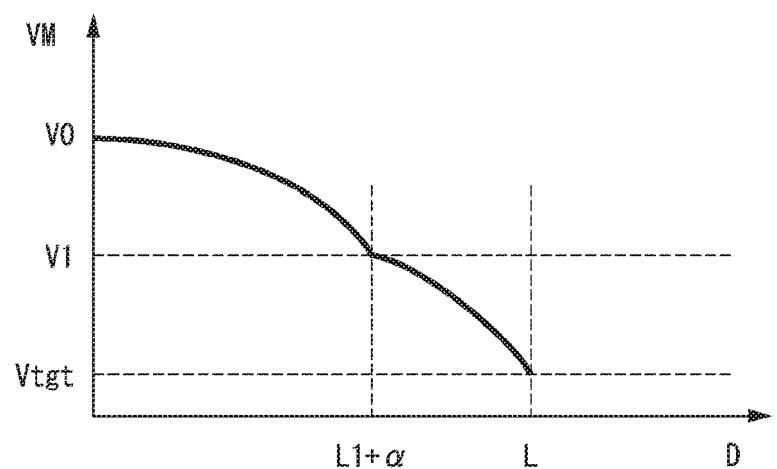
FIG. 9 is a diagram illustrating another example of a speed profile used for estimating an arrival time T.

The other vehicle m1 is in front of the gate (2). In this case, the gate selector 123Ab estimates the arrival time T on the basis of a speed profile illustrated in FIG. 9. In the drawing, α is a distance run by the other vehicle m1 until the subject vehicle M overtakes the other vehicle m1. The gate selector 123Ab, as in the example illustrated in FIG. 8, first generates a speed profile for travelling a distance L1+α and thereafter generates a speed profile for travelling a distance L−(L1+α) by using a deceleration model (described above) not causing a vehicle occupant to feel discomfort. In this case, the arrival time T is similarly calculated on the basis of Equation (1).

Figure 10:
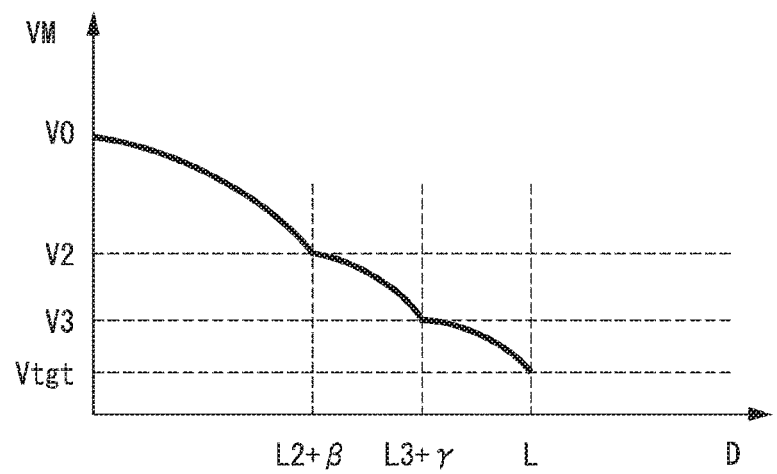
FIG. 10 is a diagram illustrating another example of a speed profile used for estimating an arrival time T.

The other vehicles m2 and m3 are in front of the gate (1). In this case, the gate selector 123Ab estimates the arrival time T on the basis of a speed profile illustrated in FIG. 10. In the drawing, β is a distance run by the other vehicle m2 until the subject vehicle M overtakes the other vehicle m2, and γ is a distance run by the other vehicle m3 until the other vehicle m2 overtakes the other vehicle m3. The gate selector 123Ab, as in the example illustrated in FIG. 8, first generates a speed profile for travelling a distance L2+β, thereafter generates a speed profile for travelling a distance (L3+γ)−(L2+β), and thereafter generates a speed profile for travelling L−(L3+γ) by using a deceleration model (described above) not causing a vehicle occupant to feel discomfort. In this case, the arrival time T is similarly calculated on the basis of Equation (1).

In the evaluation of the first point of view, the gate selector 123Ab calculates arrival times T(1) to T(3) for the gates on the basis of the speed profile and Equation (1) and evaluates a gate more highly as the arrival time T is shorter.

In addition, in a case in which a deceleration exceeds an allowed range when a speed profile until arriving at each gate is generated, the gate selector 123Ab may determine that advancement to the gate is inappropriate.

(Evaluation Technique 2)

The gate selector 123Ab may evaluate a gate more highly on the basis of the amount of passage of each valid gate as the amount of passage is larger. The reason for this is that a gate of which the amount of passage is larger has a skilled counter clerk or is an ETC gate and thus has an advantage enabling smooth passage. As described above, the amount of passage of a gate may be acquired from the road-side device TM through the communication device 20 or may be estimated on the basis of the speeds of other vehicles. In the latter case, the gate selector 123Ab, first, recognizes a vehicle row for each gate and estimates the amount of passage of the gate on the basis of the speed of another vehicle disposed at the end of the vehicle row. The gate selector 123Ab, for example, recognizes another vehicle of which an inter-vehicle distance from a preceding vehicle is equal to or shorter than a predetermined distance, a relative speed with respect to the preceding vehicle is lower than a predetermined speed, and an angle of the advancement direction formed with respect to that of the preceding vehicle is smaller than a predetermined angle as a vehicle forming the same vehicle row as the preceding vehicle. The gate selector 123Ab recognizes a vehicle group forming a vehicle row by spreadably acquiring this relation, thereby identifying another vehicle disposed at the end of the vehicle row. In addition, as the speed of another vehicle disposed at the end, not an instantaneous value but an average speed over an observation period of a certain degree (for example, about several tens of [sec]) may be used.

Figure 11:
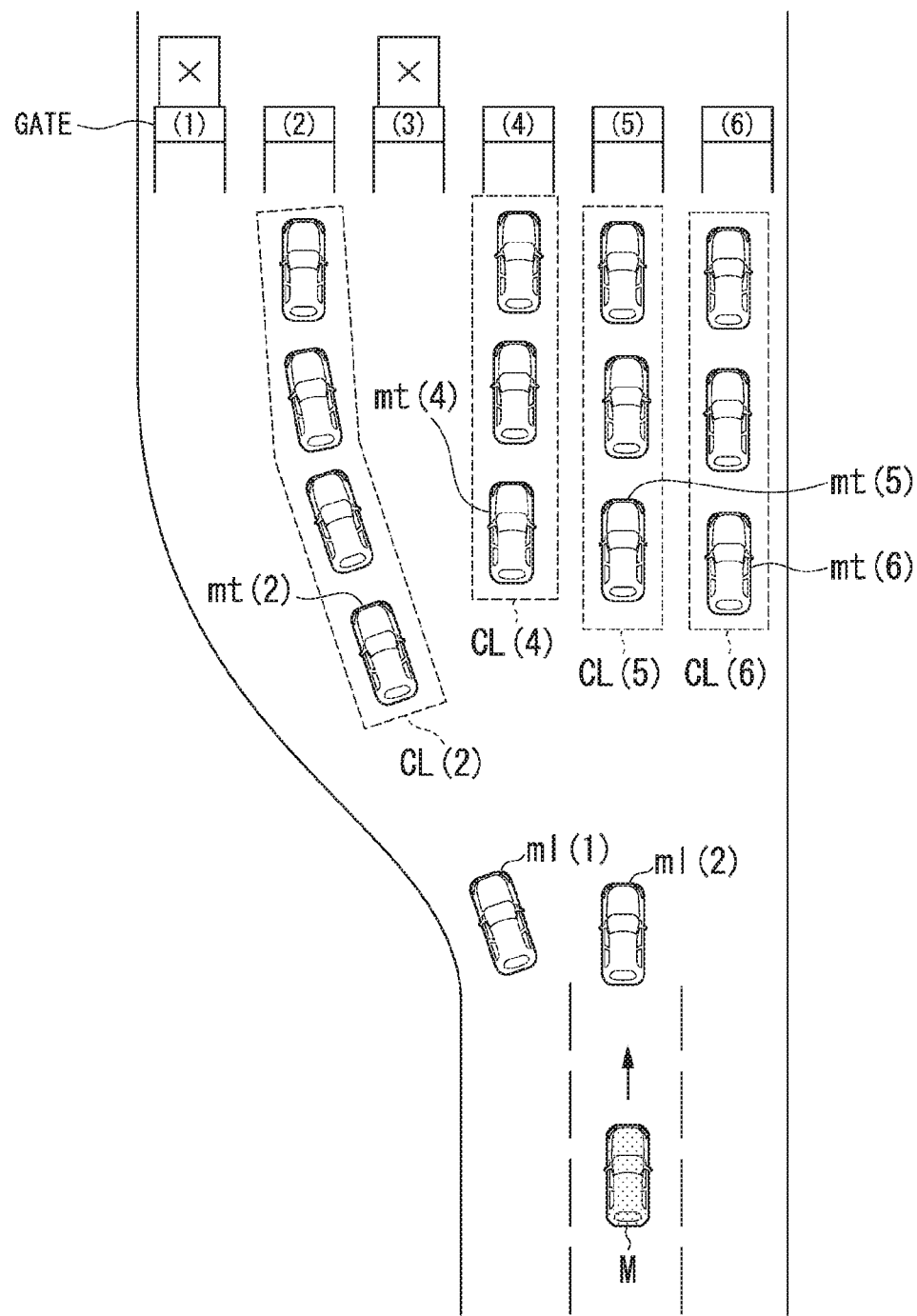
FIG. 11 is a diagram schematically illustrating a view in which an evaluation is performed using an evaluation technique 2.

FIG. 11 is a diagram schematically illustrating a view in which an evaluation is performed using an evaluation technique 2. In the drawing, gates (1) and (3) are invalid gates. As illustrated in the drawing, vehicle rows CL are formed in correspondence with gates (2), (4), (5), and (6) and are recognized by the gate selector 123Ab. The gate selector 123Ab estimates the amount of passage of the gate (2) on the basis of the speed of a vehicle mt(2) travelling at the end of the vehicle row CL(2) corresponding to the gate (2), estimates the amount of passage of the gate (4) on the basis of the speed of a vehicle mt(4) travelling at the end of the vehicle row CL(4) corresponding to the gate (4), estimates the amount of passage of the gate (5) on the basis of the speed of a vehicle mt(5) travelling at the end of the vehicle row CL(5) corresponding to the gate (5), and estimates the amount of passage of the gate (6) on the basis of the speed of a vehicle mt(6) travelling at the end of the vehicle row CL(6) corresponding to the gate (6). Then, the gate selector 123Ab evaluates a gate more highly as the amount of passage of the gate is larger.

At this time, the gate selector 123Ab may predict vehicle rows in which other vehicles (m1(1) and m1(2) illustrated in FIG. 11) not yet forming a vehicle row will be aligned and perform an evaluation taking the number of other vehicles forming the vehicle rows into account. For example, the gate selector 123Ab may apply a typical trajectory model of vehicles such as a straight line, a spline curve, a circular arc, or the like from positional changes in the other vehicles not yet forming a vehicle row and predict that the vehicles will be aligned in vehicle rows disposed at the destination of the trajectory models.

(Evaluation Technique 3)

The gate selector 123Ab may evaluate a gate more highly on the basis of the number of other vehicles forming a vehicle row corresponding to each valid gate as the number of other vehicles forming the vehicle row is smaller. The reason for this is that, as the number of other vehicles forming the vehicle row is smaller, a vehicle can arrive at the gate more quickly. Here, the reason for placing importance on not the position of other vehicles at the end of a vehicle row but the number of other vehicles forming a vehicle row is that a time required for processing at the gate depends on the number of other vehicles as a whole. For example, in a case in which a plurality of large vehicles are aligned, the vehicle row becomes long, and accordingly, the position of the other vehicle disposed at the end (a rear end part) is on the rear side. However, since the number of times processing will be performed is small, a time until the vehicle can arrive at the gate is relatively short.

However, also in a case in which the number of other vehicles forming a vehicle row is large, in a case in which an ETC card is mounted in the ETC in-vehicle device 40 of the subject vehicle M (in a case in which the subject vehicle M is an ETC vehicle), the gate selector 123Ab may evaluate an ETC gate (at least including an ETC-detected gate, and an ETC/general gate may also be included) relatively highly. In addition, other than that, there is a general gate among gates, and ETC cannot be used at a general gate. The reason for this is that processing through hand-over is not necessary for an ETC gate, and accordingly, a time required for the passage thereof is short. The gate selector 123Ab, for example, performs an evaluation of a gate by multiplying the number of other vehicles forming a vehicle row by a correction coefficient c for an ETC gate. The correction coefficient c is a value that is equal to or greater than "0" and is smaller than "1."

Figure 12:
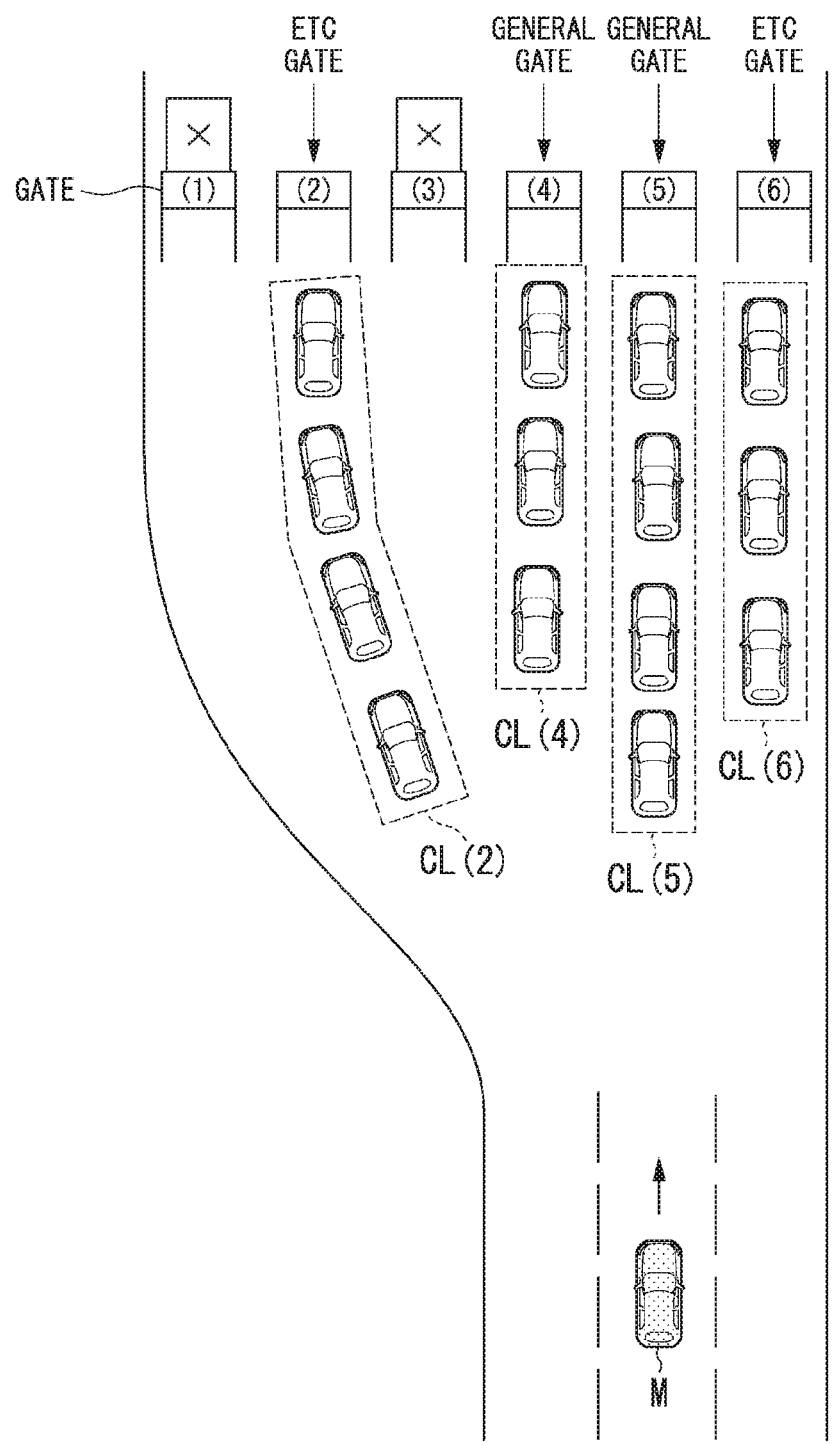
FIG. 12 is a diagram schematically illustrating a view in which an evaluation is performed using an evaluation technique 3.

FIG. 12 is a diagram schematically illustrating a view in which an evaluation is performed using an evaluation technique 3. As illustrated in the drawing, the number of other vehicles forming a vehicle row corresponding to gates (2) and (5) is four, and the number of other vehicles forming a vehicle row corresponding to gates (4) and (6) is three. The gates (2) and (6) are ETC gates, and the gates (4) and (5) are general gates. Here, when the correction coefficient ε=0.5, the number of other vehicles forming a vehicle row after correction is as follows.

Gate (2): 2
Gate (4): 3
Gate (5): 4
Gate (6): 1.5

As a result, the gate selector 123Ab evaluates the gate (6) the most highly and thereafter evaluates the gates more highly in order of the gates (2), (4), and (5). For example, when the number of valid gates is n, the gate selector 123Ab determines evaluation values as being n, n−1, . . . , 1 in order of highest to lowest evaluation.

Here, the evaluation technique 2 and the evaluation technique 3 can be combined as below. For example, the number of other vehicles forming a vehicle row is multiplied by a correction coefficient c based on whether or not a gate is an ETC gate and a correction coefficient κ based on the speed of the other vehicle disposed at the end, and a gate having a lower value may be evaluated as being higher. The correction coefficient κ is a coefficient having a smaller value as the speed of the other vehicle disposed at the end of a vehicle row is higher. In addition, the correction coefficient κ, for example, is determined as a value that is equal to or larger than "0" and is smaller than "1".

In addition, while the evaluation technique 1 is an effective technique in a case in which a place in front of gates is relatively vacant, the evaluation technique 1 has low effectiveness in a case in which congestion occurs in front of gates. On the other hand, the technique 2 and the technique 3 are effective techniques also in a case in which congestion occurs in front of gates. Accordingly, the gate selector 123Ab may switch among evaluation techniques in accordance with the congestion status in front of gates.

Figure 13:
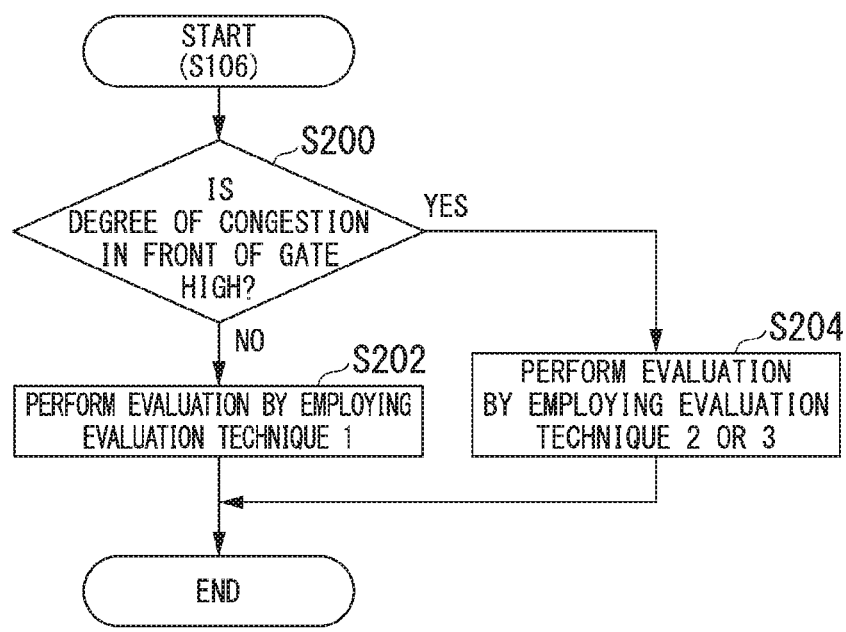
FIG. 13 is a flowchart illustrating one example of the flow of a process executed by the gate selector.

FIG. 13 is a flowchart illustrating one example of the flow of a process executed by the gate selector 123Ab. The process of this flowchart is a detailed example of the process of Step S106 illustrated in FIG. 6. First, the gate selector 123Ab determines whether or not a degree of congestion in front of gates is high (Step S200). The degree of congestion in front of gates, for example, is represented by the number of other vehicles present in front of all the gates of a tollgate. In a case in which this number of other vehicles exceeds a threshold, it is determined that "the degree of congestion in front of gates is high". The gate selector 123Ab evaluates gates by employing the evaluation technique 1 in a case in which the degree of congestion in front of gates is not high (low) (Step S202) and evaluates gates by employing the evaluation technique 2 and/or the evaluation technique 3 in a case in which the degree of congestion in front of gates is high (Step S204).

[Evaluation of Second Point of View]

Figure 14:
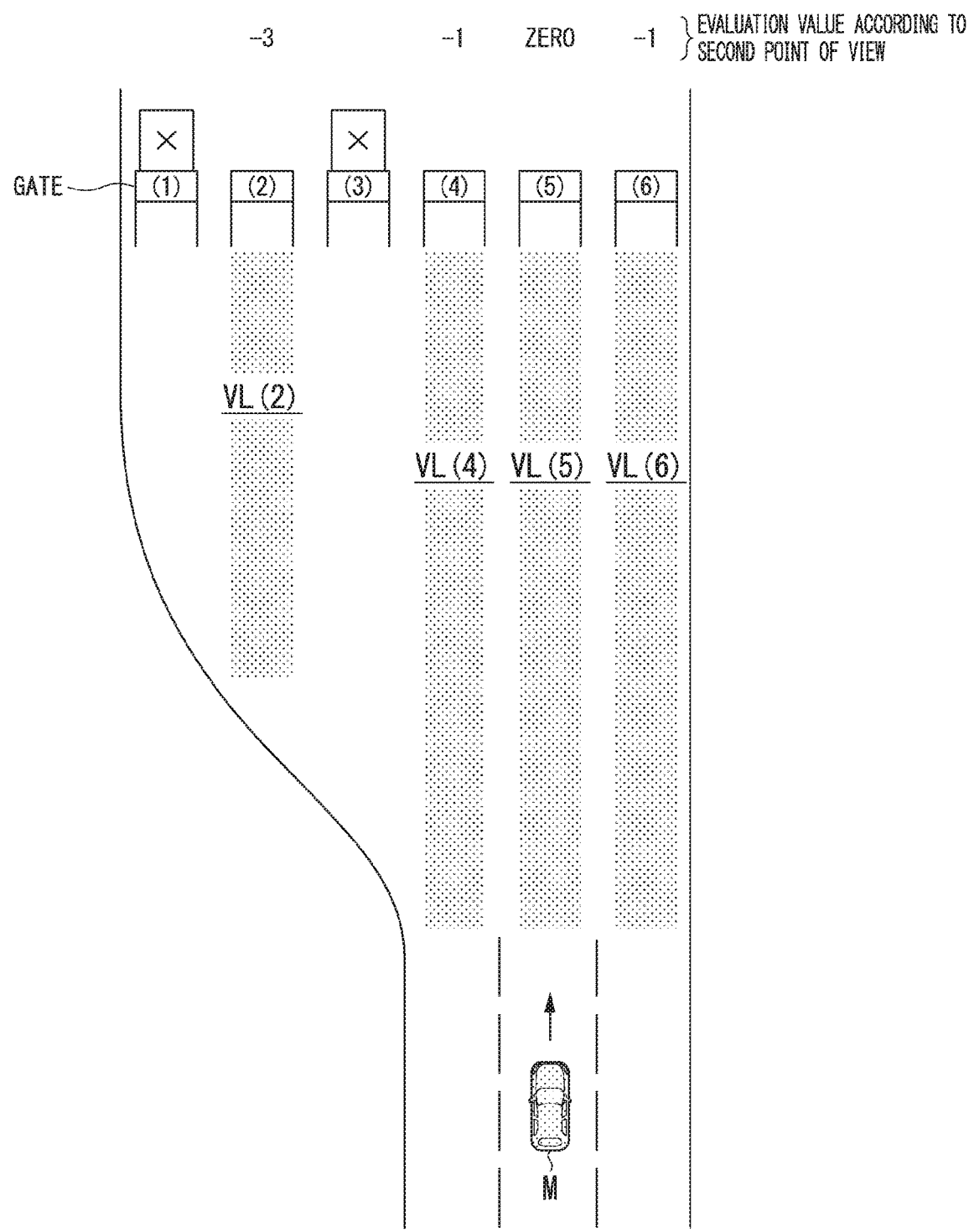
FIG. 14 is a diagram illustrating a virtual lane change.

Hereinafter, an evaluation of the second point of view will be described. The evaluation of the second point of view is to evaluate a gate as being higher as the number of times of performing a virtual lane change until arriving at the gate is smaller. FIG. 14 is a diagram illustrating a virtual lane change. As described above, also in a case in which road partition lines are not drawn in front of gates, other vehicles toward a gate naturally form a vehicle row, and, in a case in which advancement to a gate that is separate in the horizontal direction is performed under the control of automated driving, a virtual lane change with a vehicle row regarded as a virtual lane is necessary. In FIG. 14, VL(1) to VL(6) represent virtual lanes corresponding to gates.

When the number of times of performing a lane change becomes large, a control load in automated driving increases, and the flow of vehicles in front of gates may be in confusion, which is not desirable. In addition, the length of the travelling path increases as well. For this reason, in the evaluation of the second point of view, a negative evaluation is performed in accordance with an increase in the number of times of performing a virtual lane change (including a real lane change in a case in which road partition lines are drawn). For example, in the example illustrated in FIG. 14, in a case in which a subject vehicle M runs with a current horizontal position maintained, the subject vehicle M naturally advances to the virtual lane VL(5). For this reason, it can be considered that the number of times of performing a lane change is zero in the case of advancement to the gate (5), the number of times of performing a lane change is one in the case of advancement to the gate (4) or (6), the number of times of performing a lane change is two in the case of advancement to the gate (3), the number of times of performing a lane change is three in the case of advancement to the gate (2), and the number of times of performing a lane change is four in the case of advancement to the gate (1). The gate selector 123Ab, for example, determines evaluation values such that the evaluation becomes lower as the number of times of performing a lane change increases as in a case of −4 for the gate (1), −3 for the gate (2), −2 for the gate (3), −1 for the gates (4) and (6), and zero for the gate (5). In addition, the evaluation may be performed by regarding that no virtual lane is present for an invalid gate.

[Comprehensive Evaluation]

Figure 15:
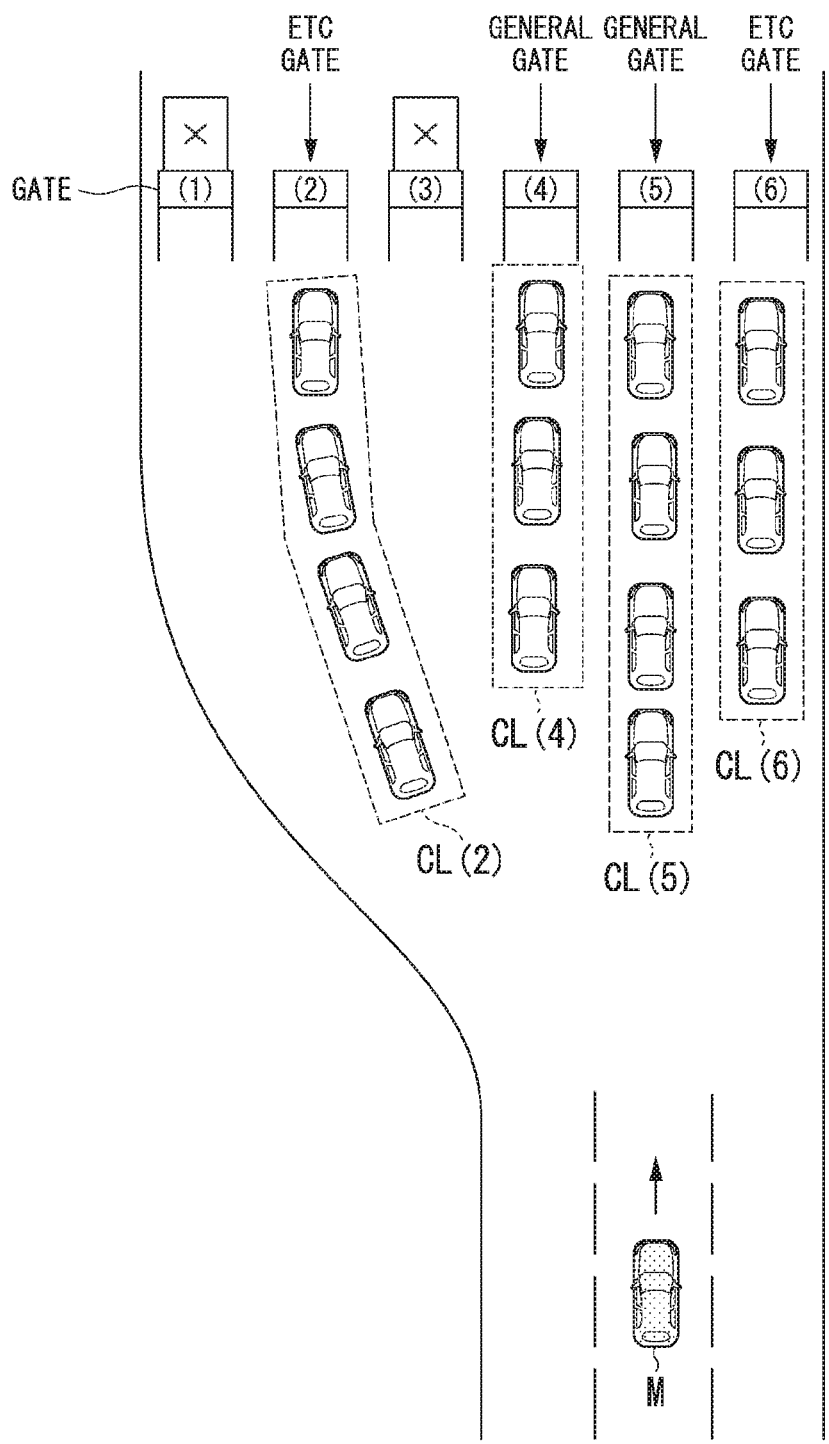
FIG. 15 is an image diagram illustrating a view in which a comprehensive evaluation is performed.

Then, the gate selector 123Ab selects a gate by performing a comprehensive evaluation combining the evaluation of the first point of view and the evaluation of the second point of view. FIG. 15 is an image diagram illustrating a view in which a comprehensive evaluation is performed. The example illustrated in this drawing illustrates a case in which the evaluation technique 3 is employed as an evaluation of the first point of view. The gate selector 123Ab, for example, adds an evaluation value according to the first point of view and an evaluation value according to the second point of view for each gate and selects a gate having a largest sum thereof. In the example illustrated in FIG. 15, a gate (6) is selected. In accordance with such control, a desired gate can be selected in accordance with a prior-gate status. In addition, in this comprehensive evaluation, a correction may be further performed such that "in a case in which a road in front of a tollgate branches, a gate through which it is easy for a vehicle to advance to a destination" is highly evaluated.

According to the passing gate determining device, the vehicle control system, the passing gate determining method, and the program according to the embodiment described above, by including the information acquirer (123Aa) acquiring a status of vehicles in front of gates in a place in which a plurality of gates are aligned in parallel with each other and the gate selector (123Ab) selecting a gate through which a vehicle will pass among the plurality of gates on the basis of the status acquired by the acquirer, an appropriate gate can be selected in accordance with the status in front of gates.

As above, although a form of the present invention has been described using an embodiment, the present invention is not limited to such an embodiment at all, and various modifications and substitutions can be applied within a range not departing from the concept of the present invention.

What is claim is:

1. A passing gate determining device comprising:
    an information acquirer configured to acquire a status of vehicles in front of gates in a place in which a plurality of gates are aligned; and
    a gate selector configured to select a gate through which a vehicle is to pass among the plurality of gates on the basis of the status acquired by the information acquirer,
    wherein the gate selector estimates an arrival time until arrival at each of the plurality of gates and selects a gate having the shortest arrival time.

2. The passing gate determining device according to claim 1,
    wherein the gate selector selects a gate on the basis of an amount of passage for each of the plurality of gates, the gate selector selecting a gate in which amount of passage is higher.

3. The passing gate determining device according to claim 2,
    wherein, the amount of passage for each of the plurality of gates is an amount per unit time.

4. The passing gate determining device according to claim 1,
    wherein the gate selector estimates an amount of passage on the basis of a speed of a vehicle disposed at the end of a vehicle row formed for each gate.

5. The passing gate determining device according to claim 1,
    wherein the gate selector selects a gate on the basis of the number of vehicles forming a vehicle row for each of the plurality of gates.

6. The passing gate determining device according to claim 5,
    wherein the gate selector selects a gate for which the number of vehicles forming the vehicle row is the smallest with priority.

7. The passing gate determining device according to claim 5,
    wherein the gate selector predicts vehicle rows in which vehicles not forming a vehicle row will be aligned among the vehicles in front of the gates and selects a gate on the basis of a result of the prediction.

8. The passing gate determining device according to claim 5,
    wherein the gate selector excludes a gate for which the number of vehicles forming the vehicle row is smaller than a predetermined number from a selection target.

9. The passing gate determining device according to claim 1,
    further comprising a mounting state detector configured to detect whether or not a medium used for an automatic toll collecting system is mounted in a medium mounting unit,
    wherein the gate selector selects a gate used only for the automatic toll collecting system with priority in a case in which it is detected by the mounting state detector that the medium is mounted in the medium mounting unit.

10. A vehicle control system comprising:
    the passing gate determining device according to claim 1; and
    an automated driving controller configured to execute automated driving such that the vehicle passes through a gate selected by the passing gate determining device.

11. The passing gate determining device according to claim 1,
    wherein,
    in a case in which congestion does not occur in front of the gates, the gate selector estimates an arrival time until arrival at each of the plurality of gates and selects a gate having the shortest arrival time,
    in a case in which congestion occurs in front of the gates, the gate selector selects a gate on the basis of an amount of passage for each of the plurality of gates and whether or not a gate is an ETC gate.

12. The passing gate determining device according to claim 1,
wherein,
in a case in which congestion does not occur in front of the gates, the gate selector estimates an arrival time until arrival at each of the plurality of gates, and selects a gate having the shortest arrival time and a number of times of performing a virtual lane change until arriving at the gate,
in a case in which congestion occurs in front of the gates, the gate selector selects a gate on the basis of an amount of passage for each of the plurality of gates, whether or not a gate is an ETC gate, and the number of times of performing a virtual lane change until arriving at the gate.

13. A passing gate determining method using a computer, the passing gate determining method comprising:
acquiring a status of vehicles in front of gates in a place in which a plurality of gates are aligned; and
selecting a gate through which a vehicle is to pass among the plurality of gates on the basis of the acquired status,
wherein the passing gate determining method further comprises estimating an arrival time until arrival at each of the plurality of gates and selecting a gate having the shortest arrival time.

14. A computer-readable non-transitory storage medium storing a program causing a computer to execute:
acquiring a status of vehicles in front of gates in a place in which a plurality of gates are aligned; and
selecting a gate through which a vehicle is to pass among the plurality of gates on the basis of the acquired status,
wherein the program causes the computer to further execute estimating an arrival time until arrival at each of the plurality of gates and selecting a gate having the shortest arrival time.

* * * * *